(12) United States Patent
Henning et al.

(10) Patent No.: US 7,644,259 B2
(45) Date of Patent: Jan. 5, 2010

(54) CUSTOMIZATION OF OPTION ROM IMAGES

(75) Inventors: Brett Henning, Colorado Springs, CO (US); Lawrence Rawe, Colorado Springs, CO (US); Roy Wade, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 555 days.

(21) Appl. No.: 11/252,846

(22) Filed: Oct. 18, 2005

(65) Prior Publication Data

US 2007/0088941 A1   Apr. 19, 2007

(51) Int. Cl.
*G06F 9/24* (2006.01)
*G06F 9/00* (2006.01)

(52) U.S. Cl. ............................... 713/1; 713/2; 713/191; 711/102

(58) Field of Classification Search ............ 713/1, 713/2, 191; 711/102
See application file for complete search history.

(56) References Cited

U.S. PATENT DOCUMENTS

| | | | | |
|---|---|---|---|---|
| 6,009,520 | A * | 12/1999 | Gharda | 713/1 |
| 6,467,038 | B1 * | 10/2002 | Piwonka et al. | 713/1 |
| 6,961,791 | B2 * | 11/2005 | Cepulis | 710/104 |
| 6,990,577 | B2 * | 1/2006 | Autry | 713/100 |
| 7,017,004 | B1 * | 3/2006 | Calligaro et al. | 711/102 |
| 7,017,040 | B2 * | 3/2006 | Singer et al. | 713/2 |
| 7,089,494 | B1 | 8/2006 | Burrell | |
| 7,228,406 | B2 * | 6/2007 | Garney | 713/1 |
| 7,353,322 | B1 * | 4/2008 | Brown | 711/102 |
| 2002/0143523 | A1 | 10/2002 | Balaji et al. | |
| 2003/0133041 | A1 | 7/2003 | Curtis et al. | |
| 2004/0003265 | A1 * | 1/2004 | Freeman et al. | 713/191 |
| 2004/0123019 | A1 * | 6/2004 | Garney | 711/102 |
| 2006/0026415 | A1 * | 2/2006 | Chen | 713/2 |

OTHER PUBLICATIONS

Howto: Changing Logo with AMIBIOS, Anton Borisov, 2004.*

* cited by examiner

*Primary Examiner*—Thomas Lee
*Assistant Examiner*—Vincent T Tran
(74) *Attorney, Agent, or Firm*—William W. Cochran; Cochran Freund & Young LLC (57) ABSTRACT

A customizable option ROM image that allows a user to modify certain features of a ROM image is described. In one embodiment, a plurality of configuration ROM image modules is provided to a user. These modules may be bundled in a single file along with a software interface application that allows the user to customize one or more of the modules. In particular, the software application provides a simple interface so that a user may identify and change particular ROM image features. Thereafter, a ROM image is built using the modules, some of which may have been modified, so that it may be installed within the customer's system.

20 Claims, 6 Drawing Sheets

CUSTOMIZATION OF OPTION ROM IMAGES

REFERENCE TO RELATED APPLICATIONS

This application relates to U.S. patent application entitled, "Configurable BIOS String," Ser. No. 10/949,578, filed on Sep. 25, 2004, which is herein incorporated by reference in its entirety.

BACKGROUND

A. Technical Field

The present invention relates generally to BIOS configuration, and more particularly, to the method for allowing customization of an option ROM by an OEM or other customer.

B. Background of the Invention

A Basic Input Output System ("BIOS") is used to properly initialize a system's hardware when power is first applied or system is restarted. The BIOS also controls the boot process, provides low-level input/output routines and allows the user to modify details of the system's hardware configuration. The BIOS is usually stored permanently in a read only memory ("ROM") storage device within a host system.

Peripherals and components such as video capture devices and storage devices may be connected to and operate within the host system. These components typically have associated optional read only memory or option ROM BIOS components. An option ROM BIOS includes a set of program instructions known as an option ROM image which provides basic control software to the host system so that the system can communicate to a peripheral controller coupled to the host system. The software of the option ROM may further include code having a configuration utility and a user interface.

Generally the contents of the option ROMs are fixed for the Original Equipment Manufacturers (OEMs). Although certain OEMs might update certain fields within an option ROM, an OEM or customer is unable to significantly modify or change an option ROM to match its particular system requirements.

Different OEMs or end-user customers may require customizing certain features in an option ROM. Typically, modifications to an option ROM are performed by the option ROM's component supplier. These modifications may range from simple to complex, which could result in a significant expenditure of resources by the supplier to write, test, and release the customized option ROM. For instance, an OEM may request a supplier to make small changes in an option ROM, such as adding their brand information in the boot banner for the option ROM. These types of minor requests may be a significant burden on a supplier and result in large number of very similar option ROM images being approved and maintained at a supplier location. A customer may request operational changes to the BIOS or certain features not available in the configuration utility. These changes may also require great effort by the supplier and significant time to implement and verify.

Figure 1:
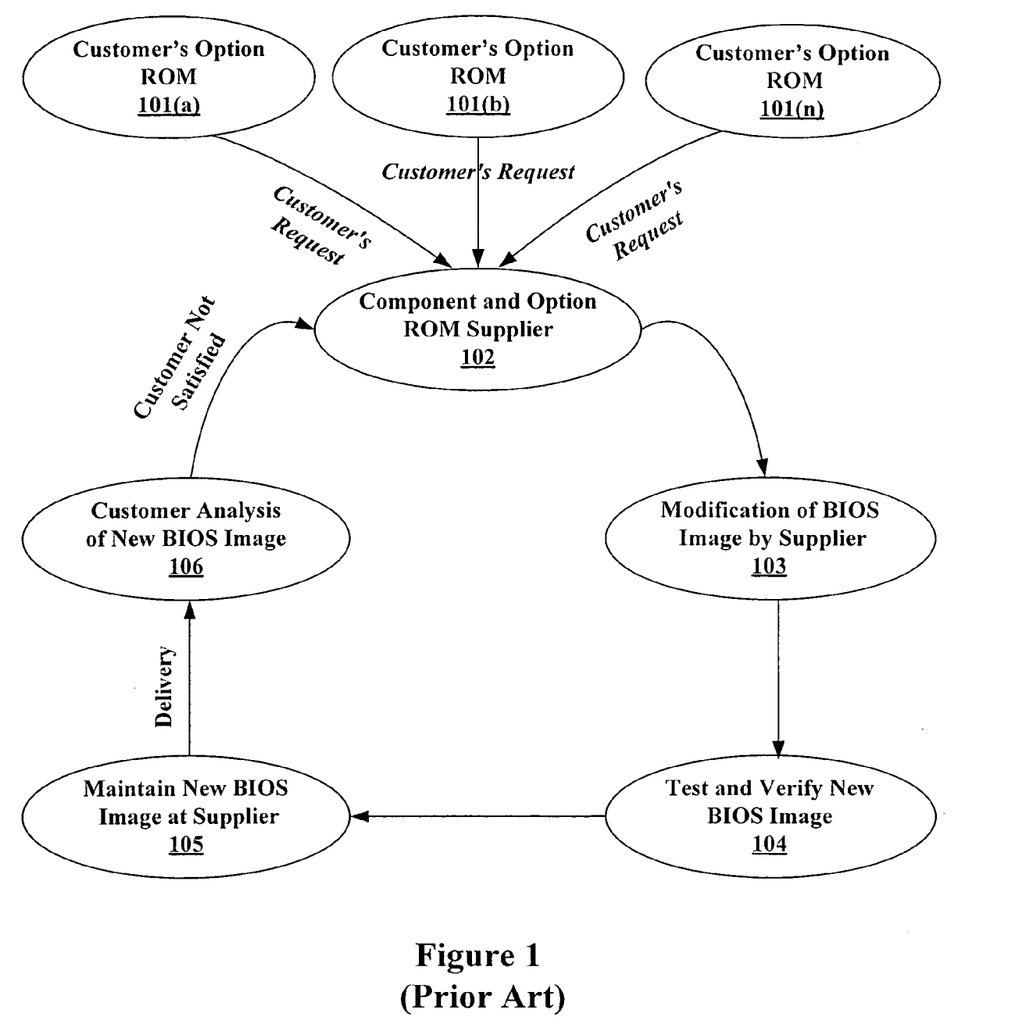

Currently, these types of requested changes are handled on a case-by-case basis for BIOS, configuration utility, and string modifications, one example of which is illustrated in FIG. 1. A number of different OEM or customer 101(a)-101(n) requests that a supplier 102 provide certain modifications in their option ROM. The desired changes are implemented 103 at the supplier and a number of subsequent procedures need to be performed to verify and maintain the modified option ROM image. For example, after the desired changes are made, the new BIOS image is tested and verified 104 by the suppler. After verification, the new BIOS image must be maintained 105 at the supplier location. The new BIOS is delivered to the customer 106 for integration testing. If, at this point, the customer or OEM found something that was not correctly changed, the process needs to be restarted.

This customization of option ROMs presents difficulties in product development because of the large amount of development resources, the test resources to test many minor changes, and the maintenance of similar BIOS image versions required in this process. With the continued growth of customers and their requirements of customizing the option ROMs, suppliers may find it even more difficult to manage and update these modifications.

Therefore, there is a need for a system and a method for allowing different customers or OEMs to manage their option ROM images to meet their particular requirements.

SUMMARY OF THE INVENTION

The present invention provides a customizable option ROM image that allows a user to modify certain features of a ROM image to meet his/her requirements. In one embodiment, a plurality of configuration ROM image modules is provided to a user. For example, the ROM image may be separated into multiple distinct modules comprising core BIOS images, core BIOS strings, a configuration utility image, configuration utility options, configuration utility strings, and other related modules. These modules may be bundled in a single file along with a software interface application that allows the user to customize one or more of the modules. In particular, the software application provides a simple interface so that a user may identify and change particular ROM image features. Thereafter, a ROM image is built using the modules, some of which may have been modified, so that it may be installed within the customer's system.

The present invention may also provide a ROM image library that allows a user to maintain and catalogue previously built ROM images. This library may be accessed by the user and data within the library may be imported into other ROM images.

In one embodiment of the invention, the software interface application and/or configurable ROM images may include security features that define access rights to data therein. For example, certain features may be provided specifically to a customer which may only be accessed through a security feature. For example, a security key file may be provided that allows unique changes to be made to one or more of the configurable ROM image files. Additionally, a user may protect certain files by requiring an access password or other security feature.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1 is a flowchart illustrating steps involved in obtaining a customized option ROM prior to the present invention.

DETAILED DESCRIPTION OF THE PREFERRED EMBODIMENTS

A system, apparatus and a method for customizing option ROM images is disclosed. In one embodiment of the present invention, an OEM or customer is allowed to customize Option ROM images using configurable BIOS images, a source application and an interfacing software application. For example, a BIOS Software Development Kit ("SDK") may be provided that interfaces with the configurable BIOS images and allows a user to modify features therein. After modifications to the configurable BIOS images are complete, the interfacing software application uses the modified configurable BIOS images to build a ROM image. Accordingly, an OEM or customer is able to build a new option ROM image specific to the customer's requirements, which may then be installed within his/her system independent of the option ROM's device supplier.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different computing systems and devices. The embodiments of the present invention may also be present in software or firmware. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

Figure 2:
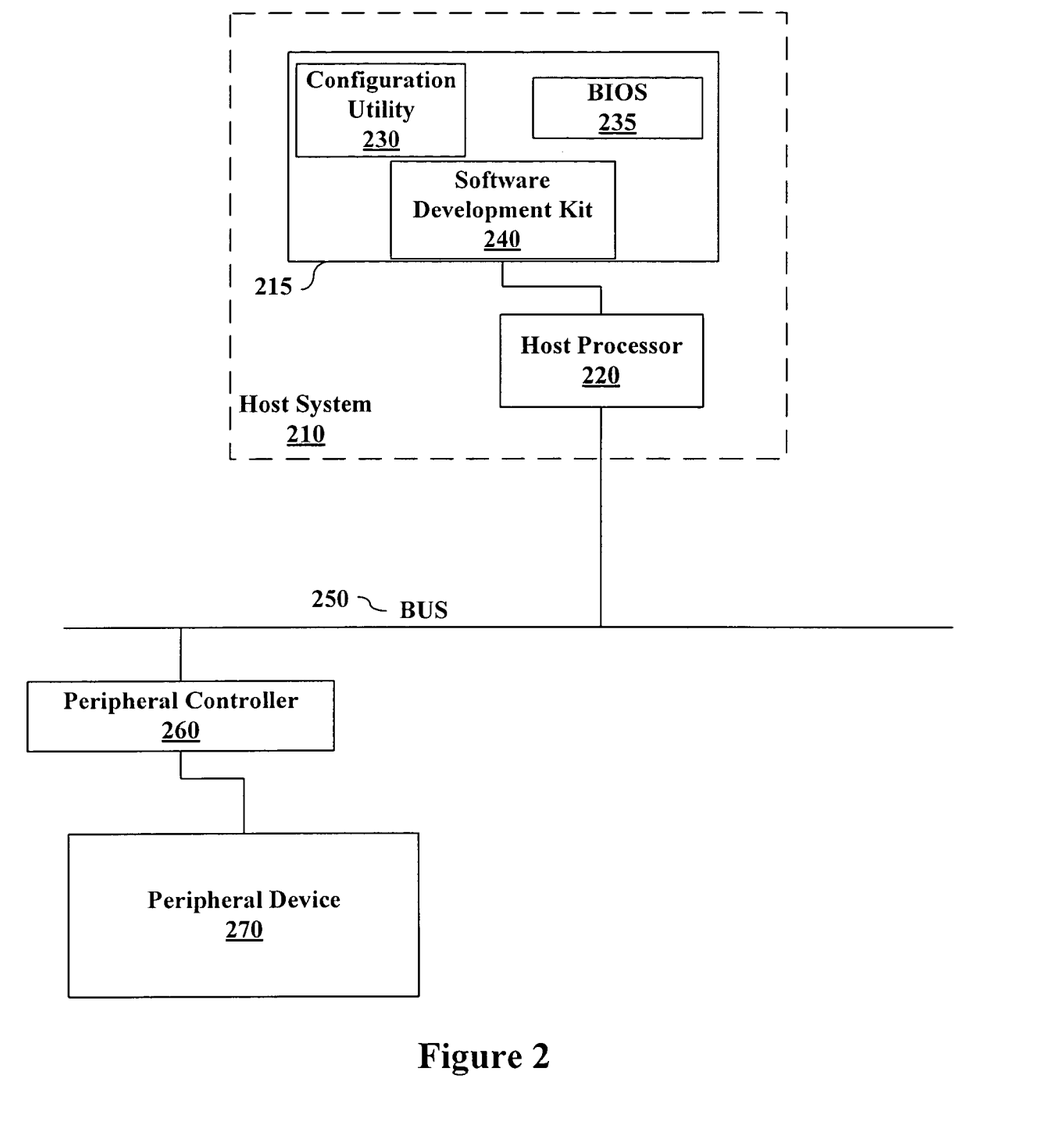
FIG. 2 is a block diagram of a host system and peripheral environment according to one embodiment of the invention.

FIG. 2 illustrates a computing environment in which a configurable option ROM image may function. A host system 210 contains a host processor 220 and memory device 215 in which a BIOS 235, a configuration utility 230, and a software development kit 240 are stored. Additionally, a peripheral device 270, such as a storage system, and associated peripheral controller 260 communicate with the host processor 220 via a bus 250.

The BIOS 235 is initiated at startup and configures the communication between the peripheral controller 260 and the host processor 220. In some embodiments, the BIOS 235 may be known as an Extensible Firmware Interface Boot Services Driver, an SRM console, an FCODE module, a shell application, or simply refer to the code executed during the startup and bootstrapping of a processor.

The BIOS 235 is typically machine executable code specific to the processor 220, which may have a hard coded procedure that looks to a specific address to start executing a program. Generally, the code may be a system ROM BIOS; however, an option ROM BIOS may also perform various functions.

The configuration utility 230 is used to set the various parameters executed by the BIOS 235. In some applications, a specific keystroke may be entered during the BIOS 235 execution to start the configuration utility 230. In many applications, the configuration utility 230 may display various messages on a display, such as the current settings of the BIOS 235 and alternative selections for the operator to choose.

In many OEM applications, a single manufacturer may supply a BIOS 235 or option ROM BIOS that is used by several different OEM vendors. These vendors may have specific requirements for their systems and need certain modifications. As previously described, these modifications may require a significant expenditure of resources by a supplier.

B. Configurable Option ROM Source Files

In one embodiment of the present invention, a user/customer is allowed to customize an option ROM image to meet particular system requirements. A BIOS Software Development Kit ("SDK") is provided for building, maintaining, and releasing option ROM images. In one embodiment of the invention, a plurality of configurable option ROM image files that may interface with the SDK is provided. Using the SDK a user may modify certain characteristics or features within these option ROM image files. The SDK may then assemble these modified image files and generate a new ROM image that integrates these modifications. Importantly, the modifications to these image files and the subsequent generation of the ROM image may be performed by an OEM or customer vendor at its own premise.

These configurable option ROM image files may be provided to the customer, along with the SDK, in single bundled file. This bundled file may have a particular format in which a standard header is provided that includes a signature byte for ensuring file integrity. If the check of this signature byte fails, the bundled file load failed. The file header may also include other information including a file version for depicting the type of the file; a bundle version; flags for the file; a checksum; an archive size depicting the size of the bundle file and the header itself; and the number of file records that follow the end of this header. The bundle file may also use several command line options as well as a key file that may be exclusively available to the manufacturer. All of these features are intended to allow the SDK to interface and modify certain content within the bundled file and ensure the integrity of data therein.

Figure 3:
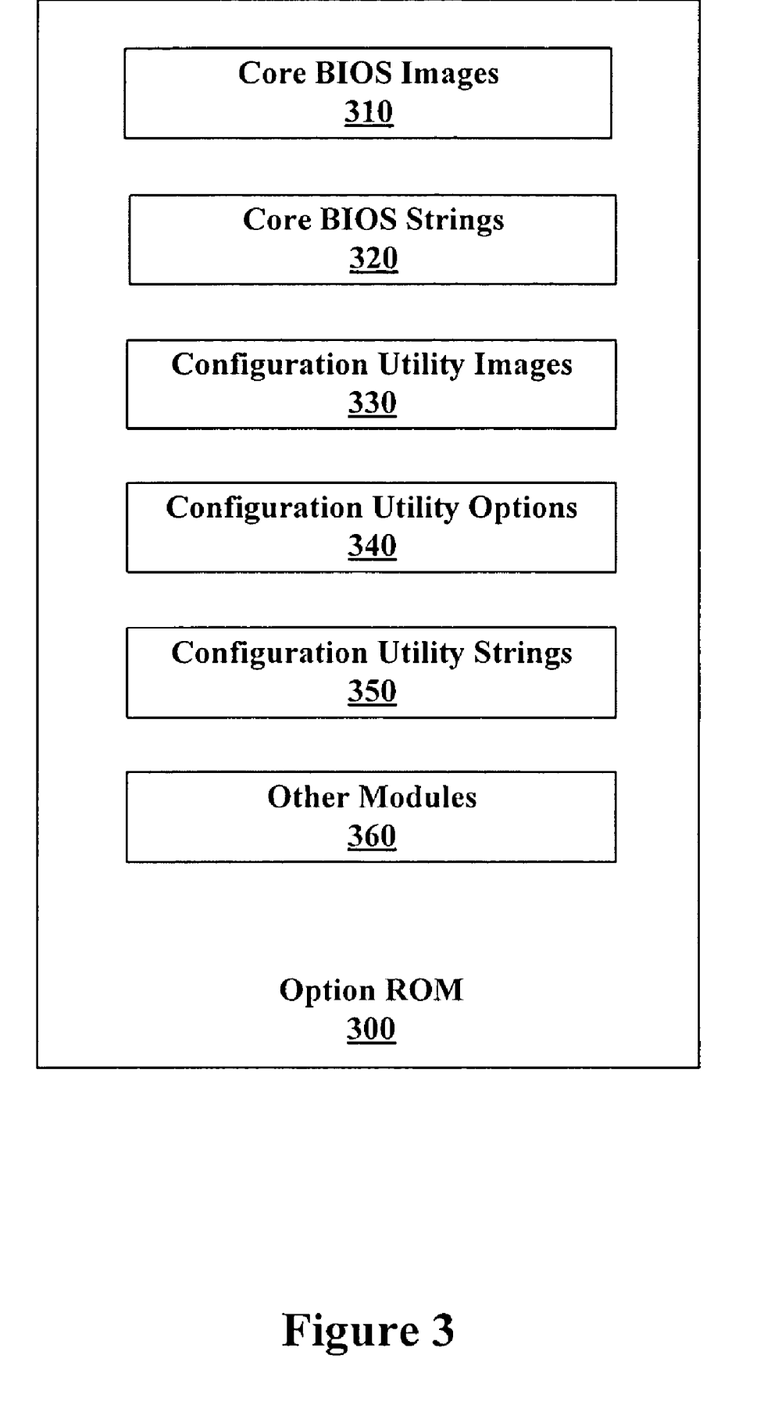
FIG. 3 is an illustration of an option ROM having multiple separate modules according to one embodiment of the invention.

FIG. 3 illustrates an exemplary configurable option ROM having multiple modules. In one embodiment of the invention, the option ROM 300 is separated into multiple modules including core BIOS images 310, core BIOS strings 320, a configuration utility image 330, configuration utility options 340, configuration utility strings 350, and other related modules 360. Each of these modules may be included in the bundled file, may be modified by a customer/OEM, and used to build various option ROM image versions.

These multiple modules (which may also be termed as source images) are formatted and stored in a particular manner to allow the SDK and a customer to efficiently interface and modify each of the modules. Each source image may be presented to the user for modification through a graphical user interface ("GUI") application having a menu to provide access to functions of the SDK. Certain executables within the modules may be precompiled so that the SDK is not required to compile it. The SDK may use command line tools to build a series of ROM application images using the modified source images or modules.

In one embodiment of the invention, the SDK uses a tree structure for displaying information about the application images and a display window to allow for user interaction and to display information. The application has a number of screens, depending on the type of information being shown. There may also be a toolbar for providing additional features.

The embodiment described below includes various modules or source images that are separated to allow characteristics therein to be modified. Other functions, not described herein, may be included within the bundled file and subsequently modified by a vendor. One skilled in the art will recognize that these modules may be divided using various different methods, all of which are intended to fall within the scope of the present invention.

a) Core BIOS Images

Figure 4A:
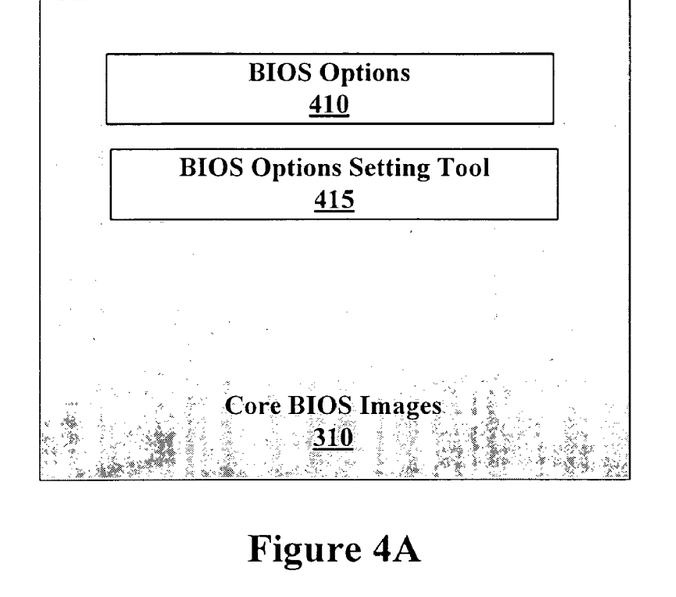
FIG. 4A is a block diagram of core BIOS images module according to one embodiment of the invention.

FIG. 4A illustrates an exemplary core BIOS images module 310 according to one embodiment of the invention. The core BIOS images module 310 has several BIOS options 410 that may be selected by a user in order to perform desired modifications to the selected module. Options such as a boot order, SCSI data path, configuration utility invocation key, and other options may be modified within these BIOS options 410. These modifications may be in a structure that a customer can easily locate and modify. For example, each BIOS option 410 may be displayed as a child entry or pull-down menu underneath the BIOS image file entry.

When a BIOS image file is selected, the BIOS options 410 are displayed to the user on the GUI screen for selecting a section containing capabilities or options defined in a BIOS options setting tool 415. Accordingly, the BIOS image may be modified in certain instances only within a defined set of modifications and in other instances without limitation.

When a BIOS options image is saved, a version number may be assigned to the particular modified option ROM image. Accordingly, an OEM or other customer may build and maintain its own library of option ROM images.

b) Core BIOS Strings

Figure 4B:
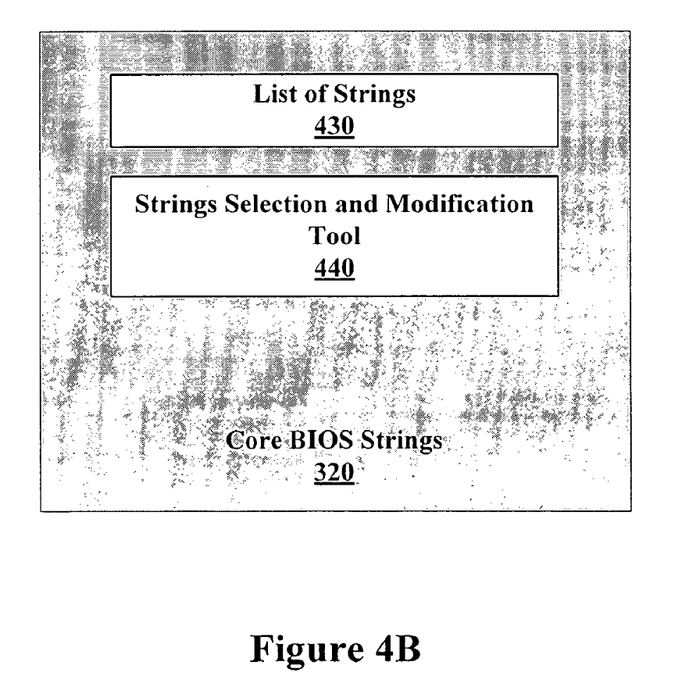
FIG. 4b is a block diagram of BIOS strings module according to one embodiment of the invention.

FIG. 4B illustrates an exemplary core BIOS strings module 320 according to one embodiment of the invention. In this particular embodiment, a string source image file consists of an application header followed by a series of string entries maintained within a list of strings 410. Each entry includes of a tag, a series of flags, and a string. The core BIOS strings module 320 may be a source-type file for strings that may be built into an application image in order to be read by a particular application, such as a configuration utility.

A string selection and modification tool 440 is provided to allow an OEM or customer vendor to easily modify strings within the core BIOS strings 320. When the SDK is modifying a particular string, it will behave in a consistent manner with the flags, including length restrictions. A given string entry mainly consists of the string itself and a tag that is displayed on the GUI screen. In one embodiment, an original version of a string is initially displayed so that the user has a reference for any changes. A ruler may also be provided over an edit box for gauging the size of the maximum line length of the string.

The string selection and modification tool 440 may also provide a translation utility to translate an entered string into a proper format. When a string change is applied, it will be checked to ensure that the string meets particular requirements and respond accordingly. For example, if a length or line count limitation is violated, an error is displayed.

c) Configuration Utilities

Figure 5A:
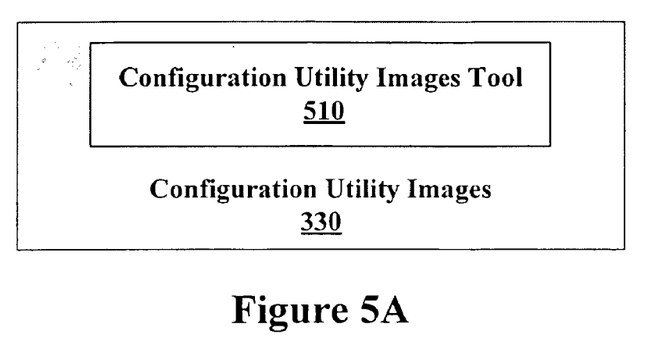
FIG. 5A is a block diagram of configuration utility image module according to one embodiment of the invention.
Figure 5B:
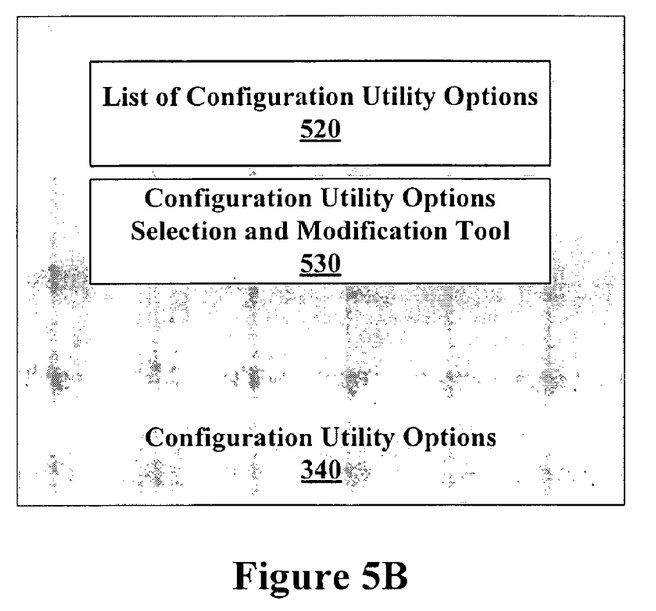
FIG. 5B is a block diagram of configuration utility options module according to one embodiment of the invention.
Figure 5C:
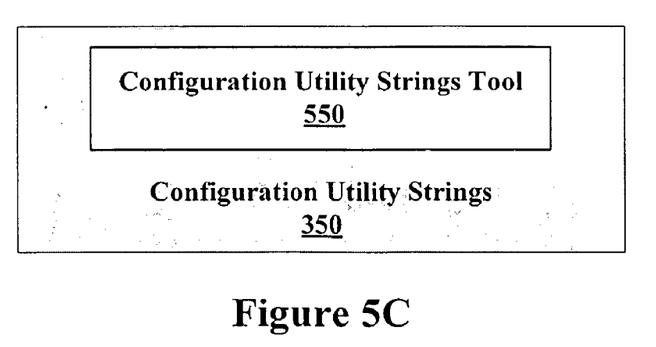
FIG. 5C is a block diagram of configuration utility string module according to one embodiment of the invention.

FIGS. 5A, 5B and 5C show exemplary configuration utility modules according to an embodiment of the invention. A configuration utility images module 330 includes a configuration utility images tool 510 which contains a number of different configuration settings relating to the configuration of the option ROM images. In one embodiment, these settings are set by a supplier and not editable by a user.

The configuration utility options module 340 allows a user to modify behavior decisions that effect runtime operation. For example, decisions such as device scan order, device types, device SAS addresses, as well as other decisions may be modified. In one embodiment, this configuration utility option module 340 includes a list of configuration utility options 520, a configuration utility options selection and modification tool 530.

The list of configuration utility option 520 may be stored in a structure so that the configuration utility options module 340 can efficiently read them and the SDK can modify them. The configuration utility options selection and modification tool 530 provides an interface in which a user may modify the options. In one embodiment, a user may select an options section, and the configurable options are displayed to the user as a series of check boxes. The user may make changes to these options by checking certain options according to his/her requirements.

One skilled in the art will recognize that various interfaces may be provided to support modification of the configuration utility options. For example, options may be separated into sections and allow a user to toggle through the various options within a particular section in order to modify a particular option.

The configuration utility strings module 350 includes a configuration utility strings tool 550 which contains a number of different configuration settings relating to the configuration of the option ROM strings. In one embodiment, these settings are configurable by a user to define a manner in which the strings are to be configured.

C. BIOS Build Process

Figure 6:
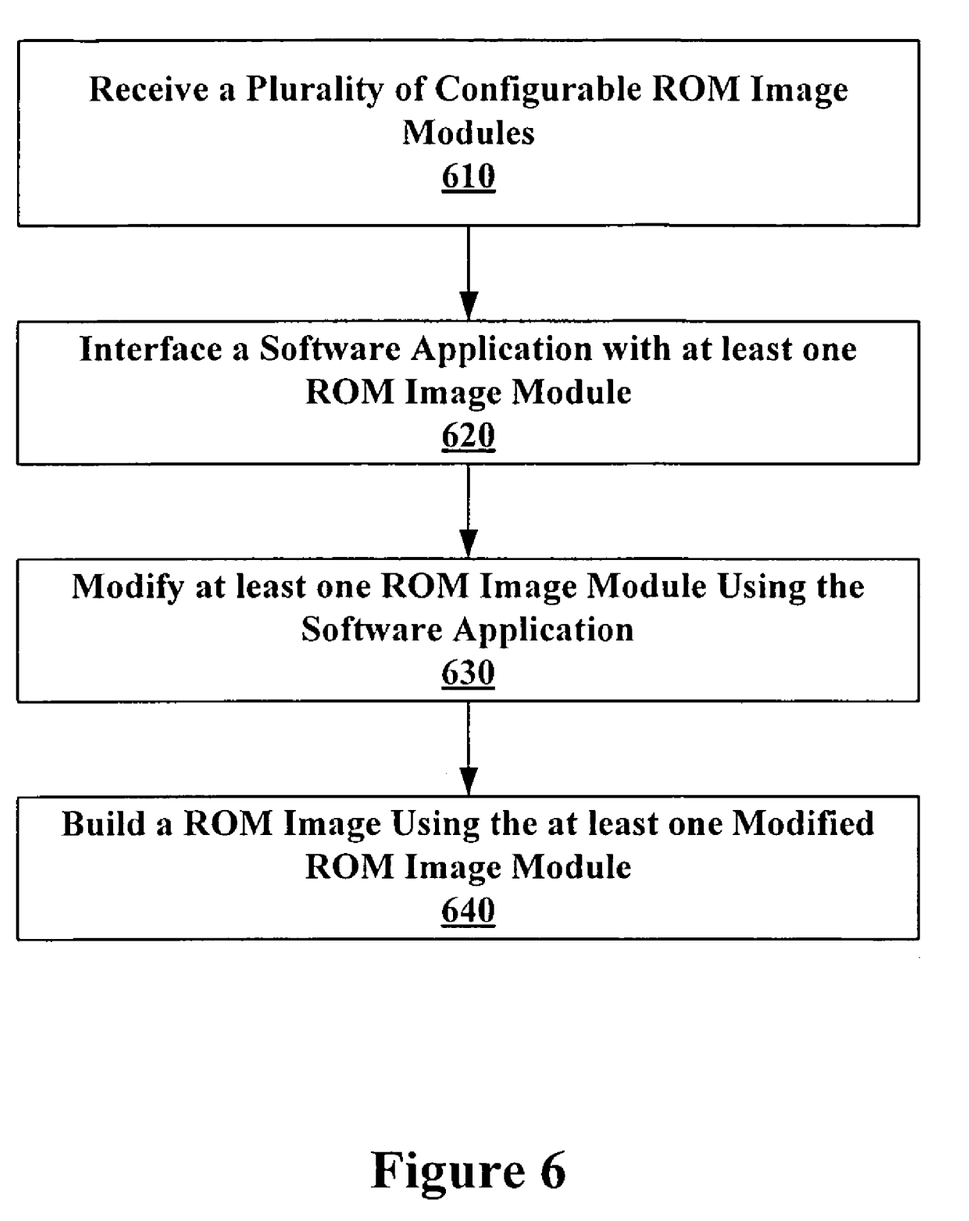
FIG. 6 is a flowchart illustrating a method for configuring an option ROM image according to one embodiment of the invention.

The BIOS build process enables a customer to build BIOS images according to its particular requirements. As previously described, a user (such as an OEM or customer) receives a plurality of configuration ROM image modules 610. In one embodiment, these modules may be bundled in a single file. A software application, such as the SDK described above, interfaces 620 with at least one of the modules. Using this software application, the vendor is able to modify 630 certain features or characteristics of one or more of the option ROM image modules. Thereafter, a ROM image is built 640 using the modules, some of which may have been modified, so that it may be installed within the customer's system.

The present invention may also provide a ROM file history for allowing the vendor to retrieve any ROM images that were built using various modified ROM image modules. In one embodiment, various features may be included within the ROM file history including allowing the vendor to select a ROM image to collect the basic information about the previous ROM images including build time and contained images as well as allowing this information to copied and stored elsewhere. Additionally, a vendor may import previously modified modules and apply the previous settings to a new module or modules. For example, a vendor may import previous string changes thus saving the time to re-key these changes into a currently viewed module.

The present invention may further provide an optional key file for security purposes. The BIOS options section of the SDK may allow some unique changes to be made through this security key file. The visibility of these options is controlled through the key file, with the effect of hiding irrelevant changes from the user. In such a scenario, all the vendor/OEM specific options would be disabled by default.

The foregoing description of the invention has been described for purposes of clarity and understanding. It is not intended to limit the invention to the precise form disclosed. Various modifications may be possible within the scope and equivalence of the appended claims.

We claim:

1. A method for configuring an option ROM image comprising a plurality of configurable ROM image modules, the method comprising:

receiving, bundled in a single file, the plurality of configurable ROM image modules and a software application that provides an interface for modifying a plurality of features of at least one configurable ROM image module, the plurality of configurable ROM image modules including a configuration utility image comprising configuration settings editable using the software application;

interfacing the software application with at least one configurable ROM image module;

modifying a feature of the at least one configurable ROM image module by using the interface provided by the software application; and building an option ROM image using the at least one configurable ROM image modules.

2. The method of claim 1 wherein the plurality of configurable ROM image modules comprises a core BIOS image module, a core BIOS strings module, a configuration utility images module, a configuration utility options module, and a configuration utility strings module.

3. The method of claim 1 wherein the plurality of configurable ROM image modules are compressed.

4. The method of claim 1 further comprising the step of requiring security authorization to access the software application or the plurality of configurable ROM image modules.

5. The method of claim 4 wherein a vendor is required to provide a security key in order to access the software application or the plurality of configurable ROM image modules.

6. The method of claim 1 further comprising the step of maintaining a file history library in which previously built ROM images are stored and catalogued.

7. The method of claim 1 wherein modification requirements are set in which the at least one configurable ROM image module may only be modified.

8. The method of claim 7 further comprising the step of rejecting a modification to the at least one configurable ROM module if the modification is not allowed by the modification requirements.

9. A system including a computer having a memory for configuring an option ROM image comprising a plurality of configurable ROM image modules, the system comprising:

a bundled file comprising the plurality of configurable option ROM image modules; and software application, bundled in the bundled file, that provides an interface to a user so that a feature modification of at least one configurable option ROM image module may be performed, the plurality of configurable ROM image modules including a configuration utility image comprising configuration settings editable using the software application.

10. The system of claim 9 wherein the software application is a software development kit provided by a supplier of the option ROM image modules.

11. The system of claim 9 wherein the plurality of configurable option ROM image modules comprises a core BIOS image module, a core BIOS strings module, a configuration utility images module, a configuration utility options module, and a configuration utility strings module.

12. The system of claim 11 wherein the core BIOS image module comprises a plurality of configurable BIOS options.

13. The system of claim 11 wherein the core BIOS strings module comprises a plurality of configurable BIOS strings.

14. The system of claim 11 wherein the configurations utility options module comprises a plurality of configurable utility options.

15. The system of claim 9 further comprising a file history library in which previously built ROM images are stored and catalogued.

16. A computer program product embodied on a computer readable medium for customizing an option ROM image comprising a plurality of configurable ROM image modules, the computer program product comprising computer instructions for:

receiving, bundled in a single file, the plurality of configurable ROM image modules and a software application that provides an interface for modifying a plurality of features of at least one configurable ROM image module, the plurality of configurable ROM image modules including a configuration utility image comprising configuration settings editable using the software application;

interfacing the software application with at least one configurable ROM image module;

modifying a feature of the at least one configurable ROM image modules using the software application; and building an option ROM image using the at least one configurable ROM or source image modules.

17. The computer program product of claim 16, further comprising computer instructions for requiring security authorization to access the software application or the plurality of configurable ROM image modules.

18. The computer program product of claim 16 wherein the plurality of configurable ROM image modules comprises a core BIOS image module, a core BIOS strings module, a configuration utility images module, a configuration utility options module, and a configuration utility strings module.

19. The computer program product of claim 16, further comprising computer instructions for maintaining a file history library in which previously built ROM images are stored and catalogued.

20. The computer program product of claim 16, further comprising computer instructions for establishing modification requirements in which the at least one configurable ROM image module may be modified.

* * * * *